US012737386B2

(12) United States Patent
Francis et al.

(10) Patent No.: US 12,737,386 B2
(45) Date of Patent: Sep. 15, 2026

(54) ACCESS DATA CLASSIFICATION SYSTEM

(71) Applicant: Visa International Service Association, San Francisco, CA (US)

(72) Inventors: Aadithya Jerome Prabhakar Francis, Cedar Park, TX (US); Eric Le Saint, Los Altos, CA (US); Dhruv Manish Gada, Foster City, CA (US)

(73) Assignee: Visa International Service Association

( * ) Notice: Subject to any disclaimer, the term of this patent is extended or adjusted under 35 U.S.C. 154(b) by 0 days.

(21) Appl. No.: 18/984,259

(22) Filed: Dec. 17, 2024

(65) Prior Publication Data

US 2025/0200074 A1 Jun. 19, 2025

Related U.S. Application Data

(60) Provisional application No. 63/611,791, filed on Dec. 19, 2023.

(51) Int. Cl.
*G06F 16/28* (2019.01)

(52) U.S. Cl.
CPC .................................. *G06F 16/285* (2019.01)

(58) Field of Classification Search
CPC .. G06F 16/285; G06F 16/24578; G06F 16/35; G06F 16/353; G06F 16/93; G06F 18/2178; G06F 18/2155; G06F 18/41; G06F 40/242; G06F 40/237; G06F 18/24; G06F 18/23; G06F 16/65; G06F 16/55; G06F 40/284; G06N 3/09
USPC .......................................................... 707/738
See application file for complete search history.

(56) References Cited

U.S. PATENT DOCUMENTS

2019/0065470 A1* 2/2019 Matthews ................ G06N 7/01
2020/0019561 A1* 1/2020 Doyle ................... G06F 16/287
2020/0372030 A1* 11/2020 Posner .............. G06F 16/24544
2022/0171925 A1* 6/2022 Roy ...................... G06F 40/166
2023/0102892 A1* 3/2023 Wu ......................... G06F 40/30
707/737

(Continued)

FOREIGN PATENT DOCUMENTS

CN 114238632 A 3/2022

*Primary Examiner* — Evan Aspinwall
(74) *Attorney, Agent, or Firm* — K&L Gates LLP

(57) ABSTRACT

A computer-implemented method includes performing a frequency analysis on unlabeled access data to identify high frequency occurrences and low frequency occurrences in the unlabeled access data; grouping the occurrences into groupings based on the frequency analysis; generating access-data corpora based on the groupings, and an initial dictionary using a similarity algorithm, wherein the initial dictionary is manually created from the unlabeled access data, and wherein the access-data corpora comprise n-gram dictionaries; determining, by an unsupervised natural language processing module, first multi-label classifications for the unlabeled access data, wherein the first multi-label classifications are based on the access-data corpora; determining, by a supervised neural network, second multi-label classifications for the unlabeled access data, wherein the second multi-label classifications are based on the access-data corpora and a manually-labeled subset of the access data; and applying multi-label classifiers to the unlabeled access data based on the first and second multi-label classifications.

20 Claims, 9 Drawing Sheets

(56) References Cited

U.S. PATENT DOCUMENTS

| | | | | |
|---|---|---|---|---|
| 2023/0161964 | A1 | 5/2023 | Shah et al. | |
| 2023/0351194 | A1* | 11/2023 | Wright | G06Q 30/0202 |

* cited by examiner $$S = K_1 * \frac{\sum_{i=0}^{i=n} \omega 1_i \cdot edf1_i}{\sum_{i=0}^{i=n} \omega 1_i} + K_2 * \frac{\sum_{i=0}^{i=n} \omega 2_i \cdot enf2_i}{\sum_{i=0}^{i=n} \omega 2_i} - K_3 * \frac{\sum_{i=0}^{i=n} \omega 3_i \cdot Sf_i}{\sum_{i=0}^{i=n} \omega 3_i} + P$$

*K = Constant, ω = Weight, edf = Entitlement Description Frequency,*
*enf = Entitlement Name Frequency, n = n - Gram, S = Stopword frequency, P = Privilege value*

ACCESS DATA CLASSIFICATION SYSTEM

CROSS-REFERENCE TO RELATED APPLICATION

This application claims the benefit of and priority under 35 U.S.C. § 119 (e) to U.S. Provisional Application Ser. No. 63/611,791, filed Dec. 19, 2023, entitled ACCESS DATA CLASSIFICATION SYSTEM, the contents of which is hereby incorporated by reference in its entirety herein.

TECHNICAL FIELD

The following disclosure relates generally to data classification, and particularly to access data classification using multi-label classification of the access data.

SUMMARY

In various embodiments, a computer-implemented method is disclosed. The method includes performing a frequency analysis on unlabeled access data to identify high frequency occurrences and low frequency occurrences in the unlabeled access data, grouping the high frequency occurrences in a first grouping and the low frequency occurrences in a second grouping, generating access-data corpora based on the first grouping, the second grouping, and an initial dictionary using a similarity algorithm, determining first multi-label classifications for the unlabeled access data and second multi-label classifications for the unlabeled access data, comparing the first multi-label classifications and the second multi-label classifications, and applying multi-label classifiers to the unlabeled access data based on the comparison of the first multi-label classifications and the second multi-label classifications. The initial dictionary is manually created from the unlabeled access data. The access-data corpora include n-gram dictionaries. The first multi-label classifications are determined by an unsupervised natural language processing module and based on the access-data corpora. The second multi-label classifications are determined by a supervised neural network module and based on the access-data corpora and a manually-labeled subset of the access data.

In various embodiments, an access-data classification system is disclosed. The access-data classifier includes an access-data corpora generator, an unsupervised natural language processing module, and a supervised neural network trained by a manually-labeled subset of the access data and the access-data corpora. The access-data corpora generator is configured to receive access data, receive an initial dictionary based on the access data, perform a frequency analysis on the access data to identify high frequency occurrences and low frequency occurrences in the access data, group the high frequency occurrences in a first grouping, group the low frequency occurrences in a second grouping, and generate access-data corpora based on the first grouping, the second grouping, and the initial dictionary using a similarity algorithm. The initial dictionary is manually created. The access-data corpora includes n-gram dictionaries. The unsupervised natural language processing module is configured to receive the access data, receive the access-data corpora from the access-data corpora generator, and determine first multi-label classifications for the access data. The first multi-label classifications are based on the access-data corpora. The supervised neural network is configured to determine second multi-label classifications for the access data independent of the first multi-label classifications. The access-data classification system is configured to apply multi-label classifiers to the access data based on a comparison of the first multi-label classifications and the second multi-label classifications.

A computer-implemented method includes performing a frequency analysis on unlabeled access data to identify high frequency occurrences and low frequency occurrences in the unlabeled access data; grouping the occurrences into a plurality of groupings based on the frequency analysis; generating access-data corpora based on the plurality of groupings, and an initial dictionary using a similarity algorithm, wherein the initial dictionary is manually created from the unlabeled access data, and wherein the access-data corpora comprise n-gram dictionaries; determining, by an unsupervised natural language processing module, first multi-label classifications for the unlabeled access data, wherein the first multi-label classifications are based on the access-data corpora; determining, by a supervised neural network module, second multi-label classifications for the unlabeled access data, wherein the second multi-label classifications are based on the access-data corpora and a manually-labeled subset of the access data; and applying multi-label classifiers to the unlabeled access data based on the first multi-label classifications and the second multi-label classifications.

BRIEF DESCRIPTION OF THE DRAWINGS

In the description, for purposes of explanation and not limitation, specific details are set forth, such as particular aspects, procedures, techniques, etc., to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and they serve to further illustrate aspects of concepts that include the claimed disclosure and explain various principles and advantages of those aspects.

Figure 1:
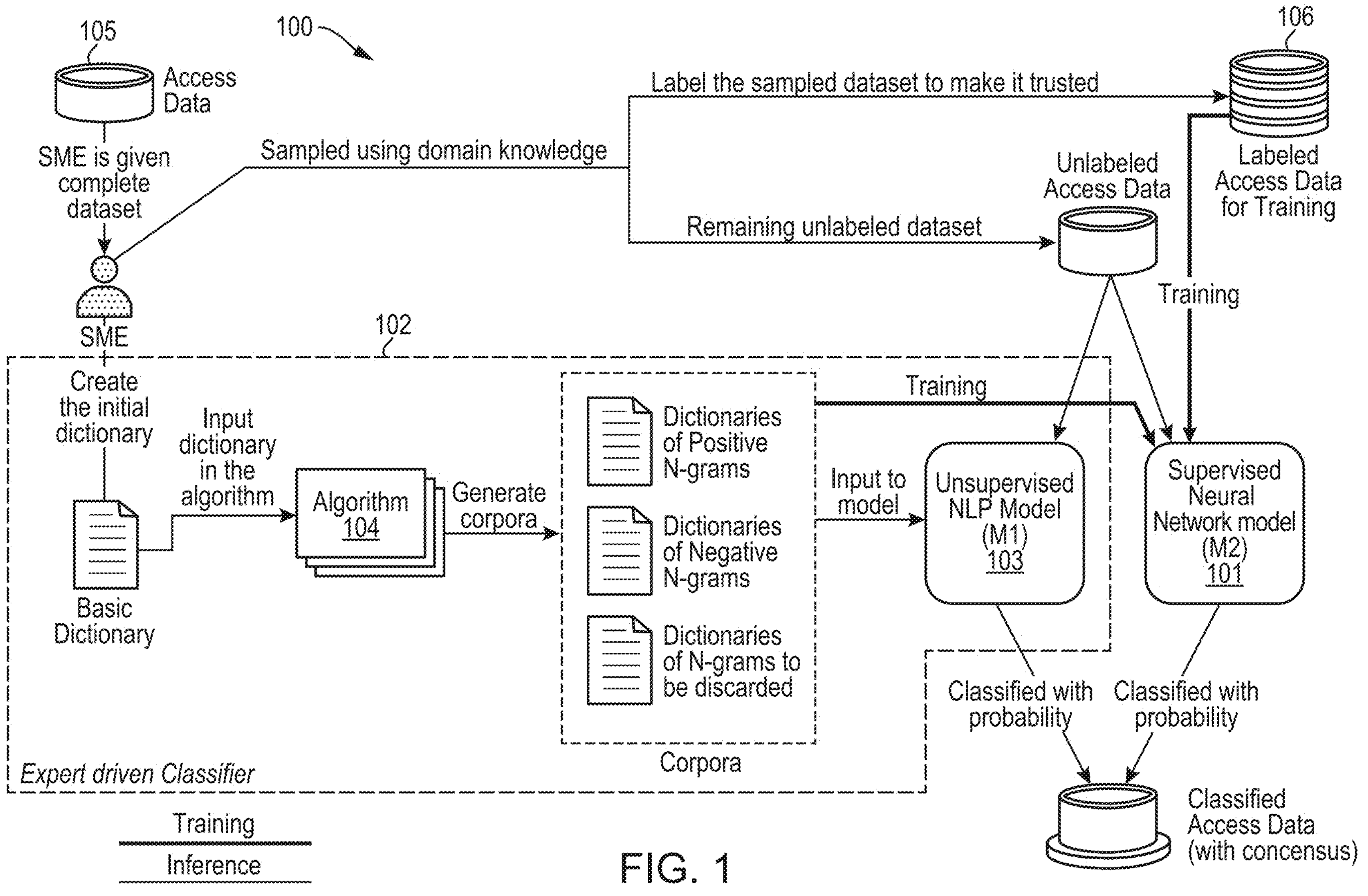

The systems and methods disclosed herein have been represented, where appropriate, by conventional symbols in the drawings, showing only those specific details that are pertinent to understanding the various aspects of the present disclosure so as not to obscure the disclosure with details that will be readily apparent to those of ordinary skill in the art, having the benefit of the description herein.

FIG. 1 illustrates a multi-label classification system for labeling access related data, according to at least one aspect of the present disclosure.

Figure 2:
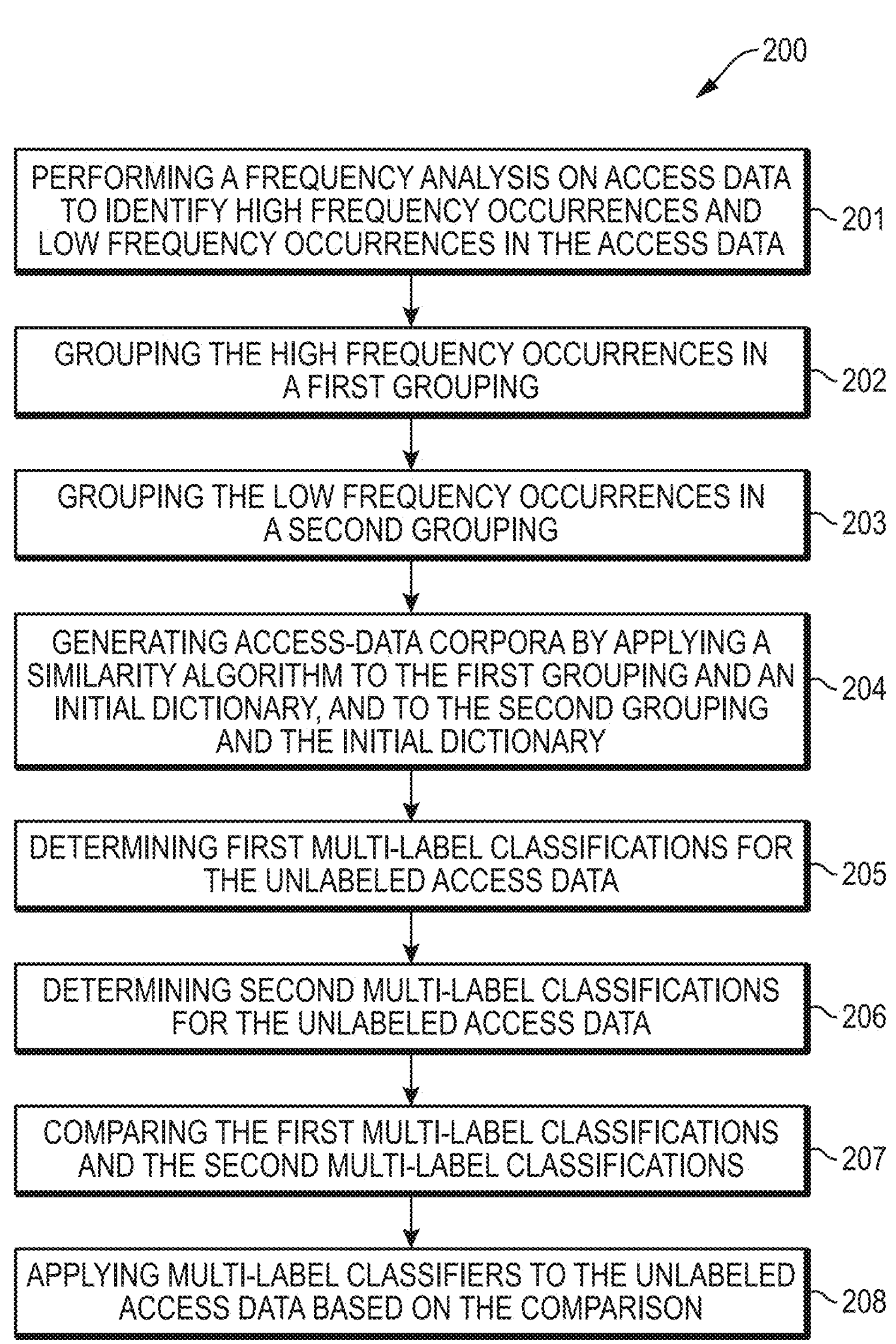

FIG. 2 is a method of applying multi-label classifications to access related data, according to at least one aspect of the present disclosure.

Figure 3:
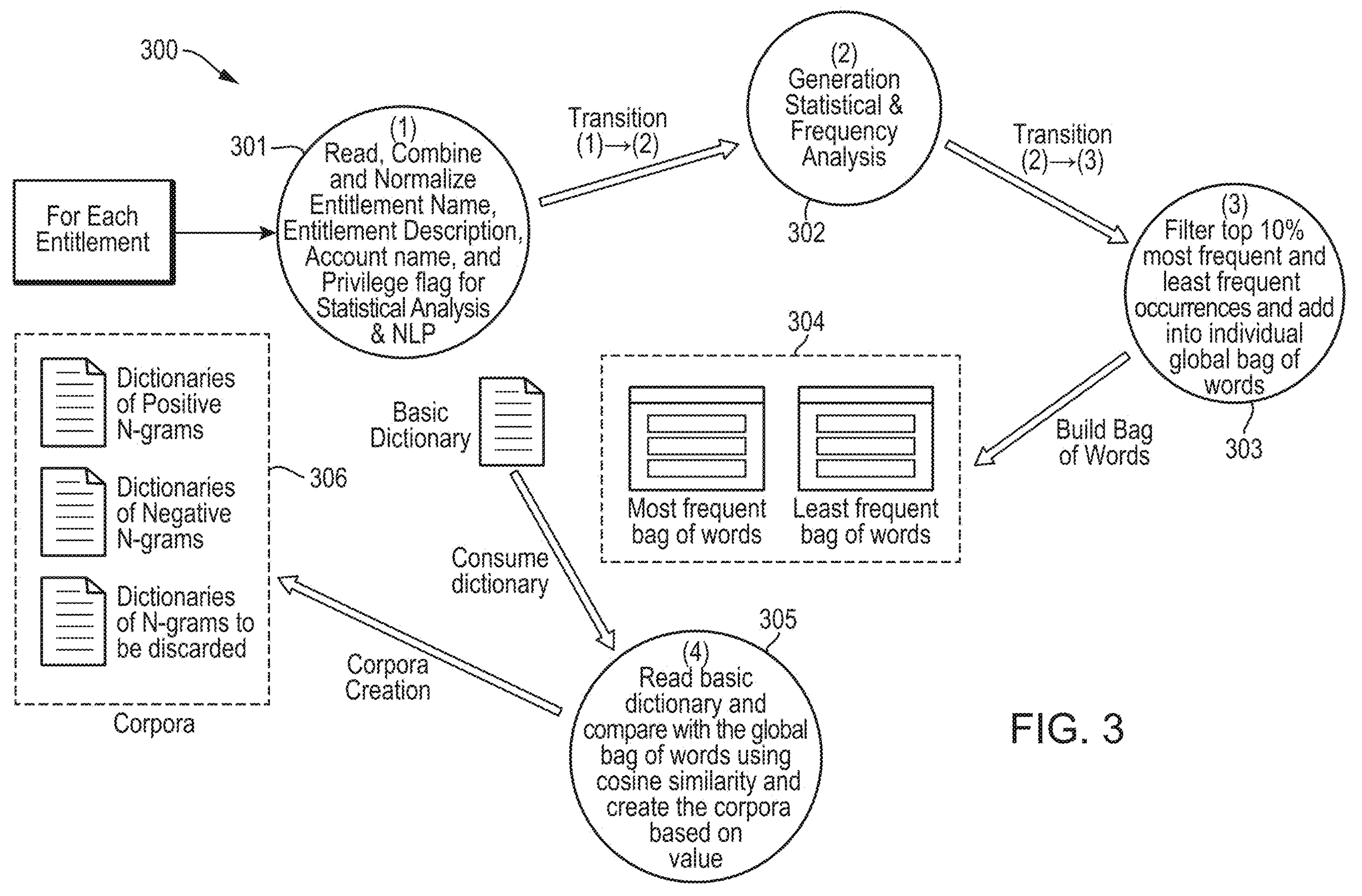

FIG. 3 is a method of generating entitlement corpora, according to at least one aspect of the present disclosure.

Figure 4:
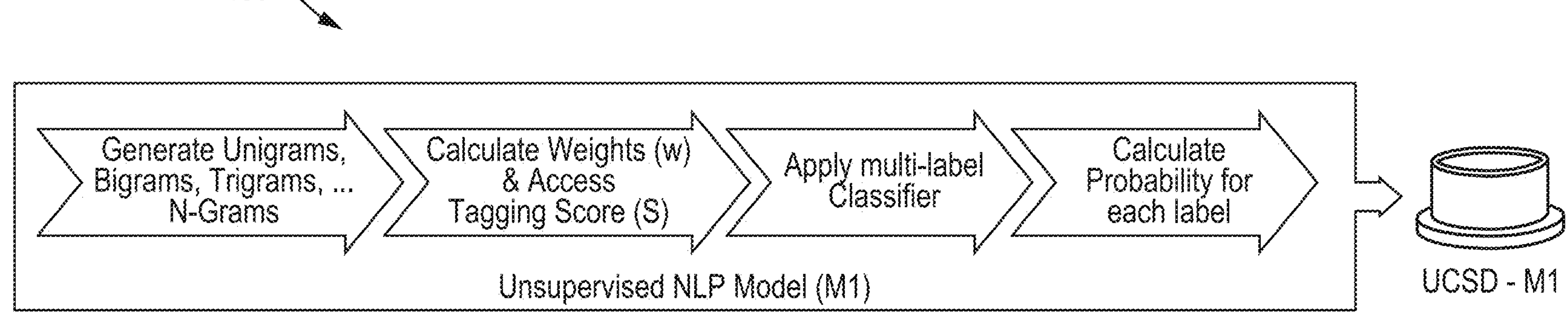

FIG. 4 is a method of generating multi-label classifications for access data, according to at least one aspect of the present disclosure.

Figure 5A:
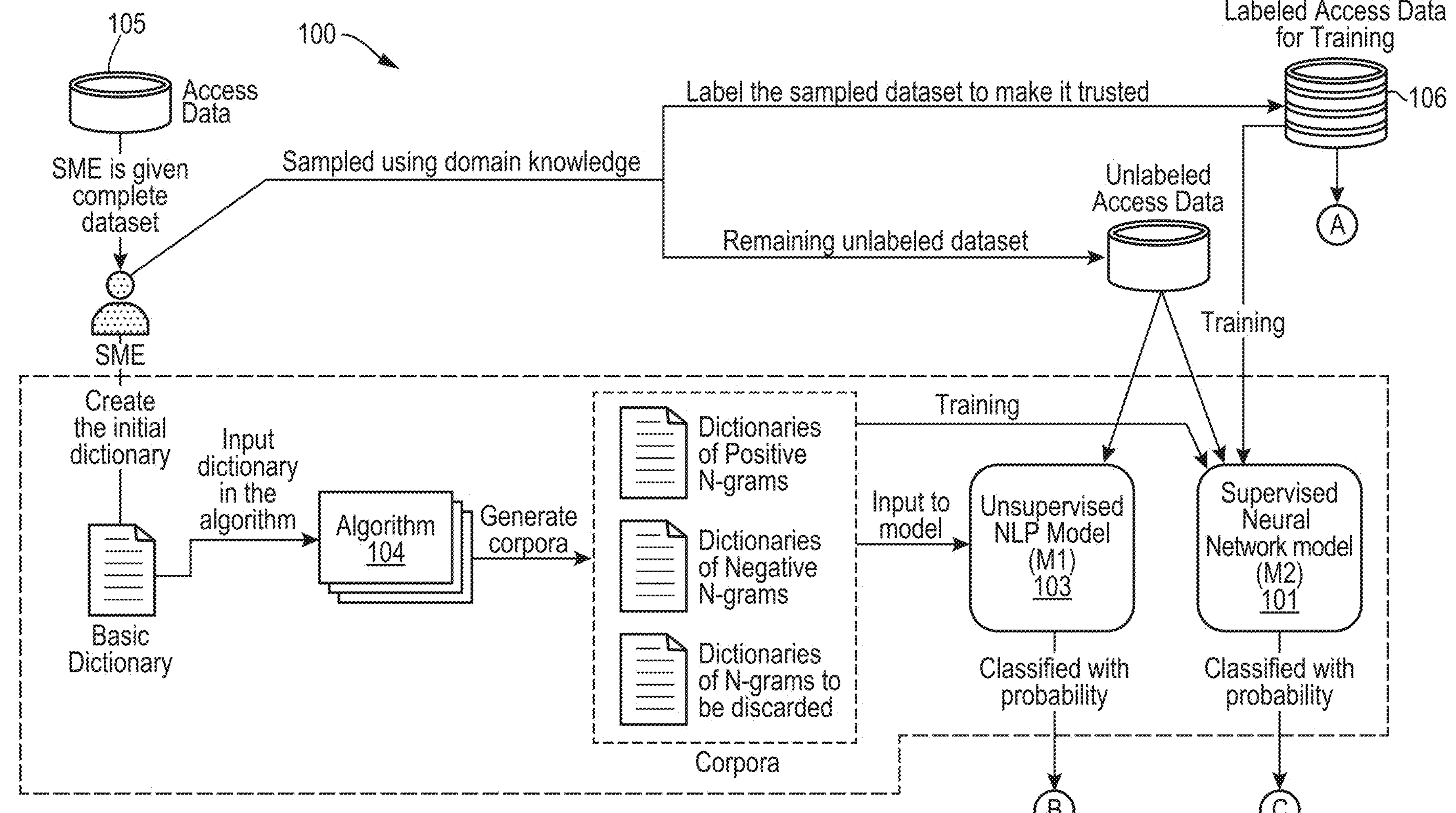
Figure 5B:
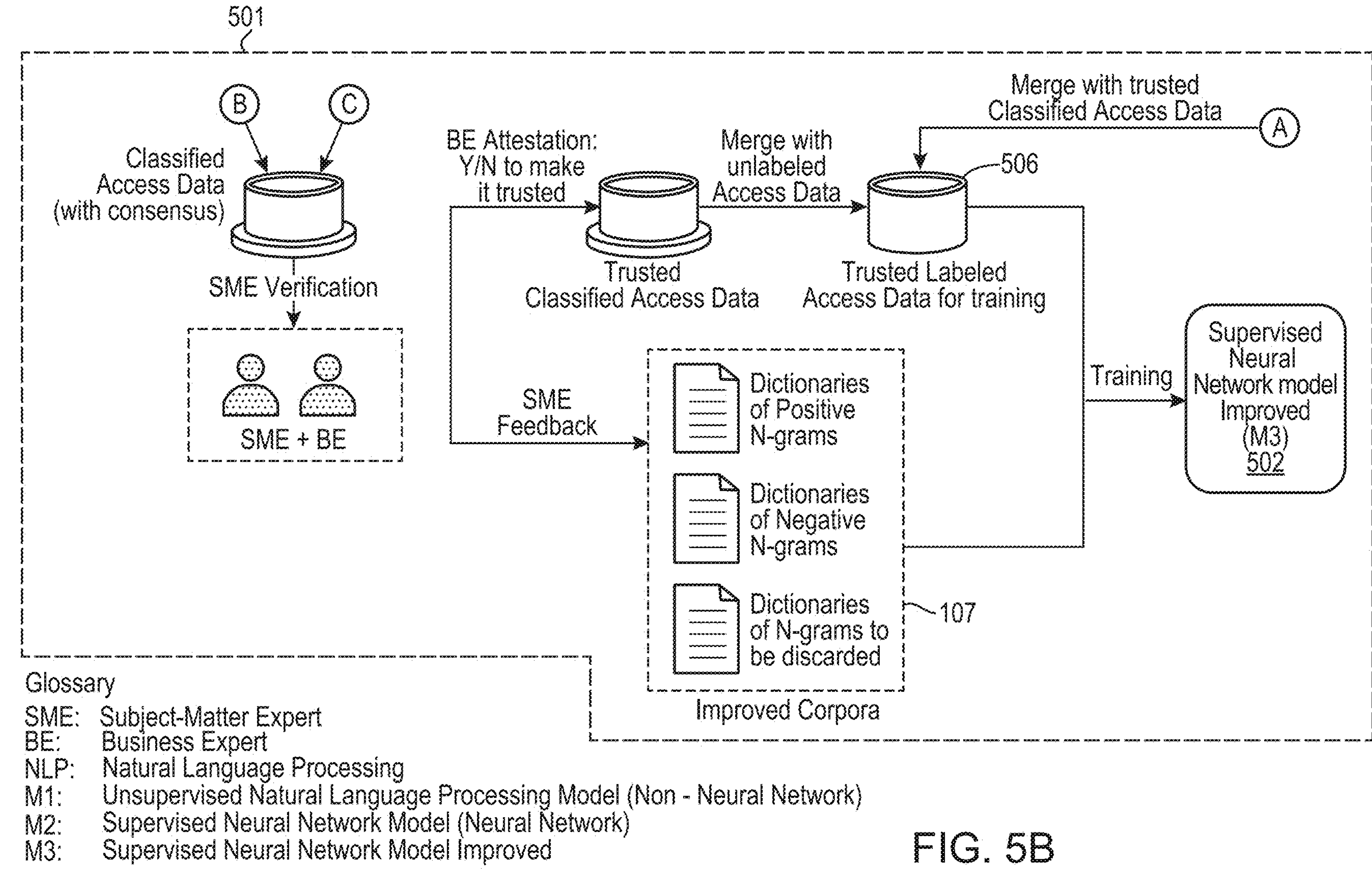

FIGS. 5A and 5B illustrate a multi-label classification system for labeling access related data, according to at least one aspect of the present disclosure.

Figure 5C:
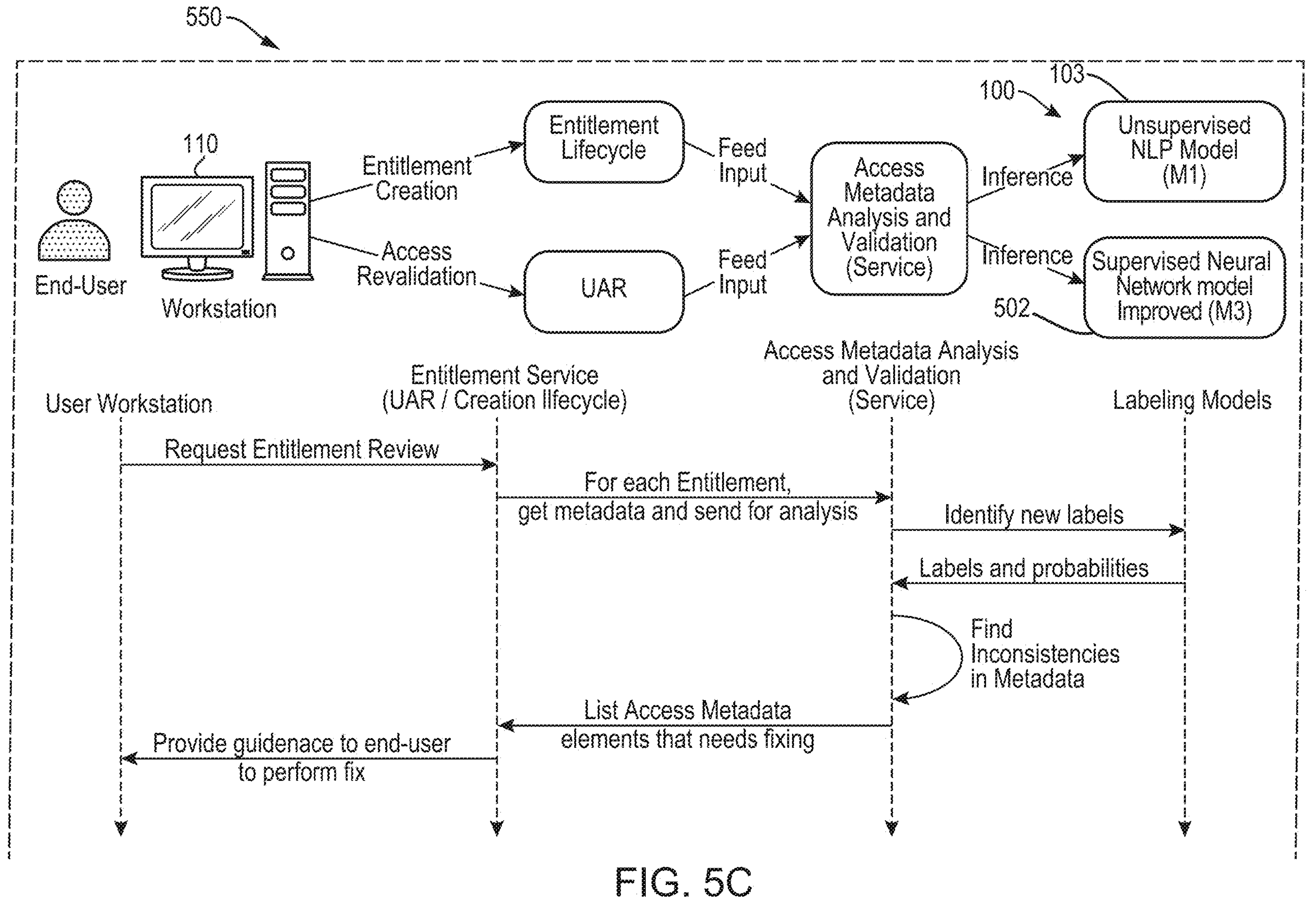

FIG. 5C is a method of improved entitlement labeling, according to at least one aspect of the present disclosure.

Figure 6:
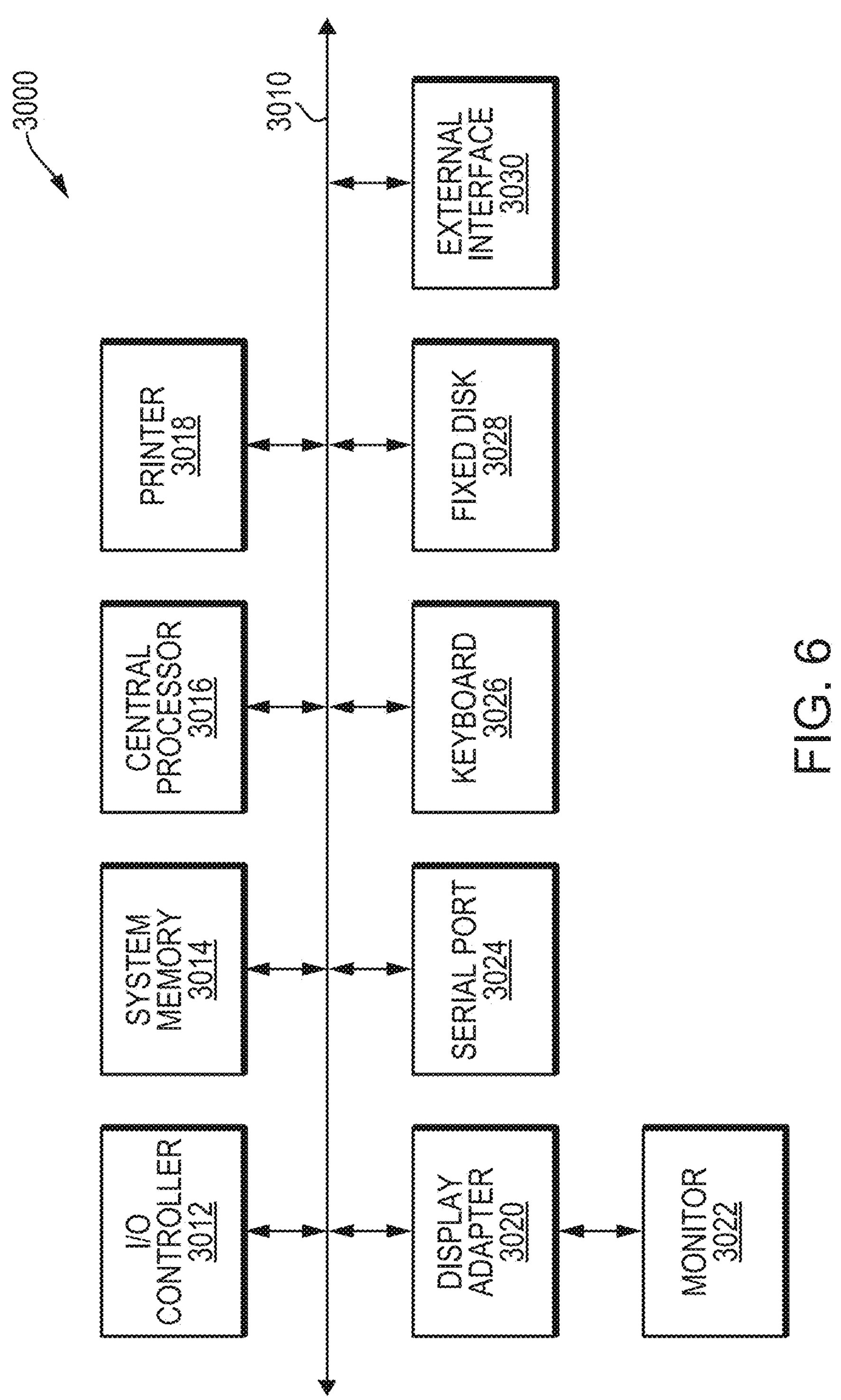

FIG. 6 is a block diagram of a computer apparatus with data processing subsystems or components, according to at least one aspect of the present disclosure.

Figure 7:
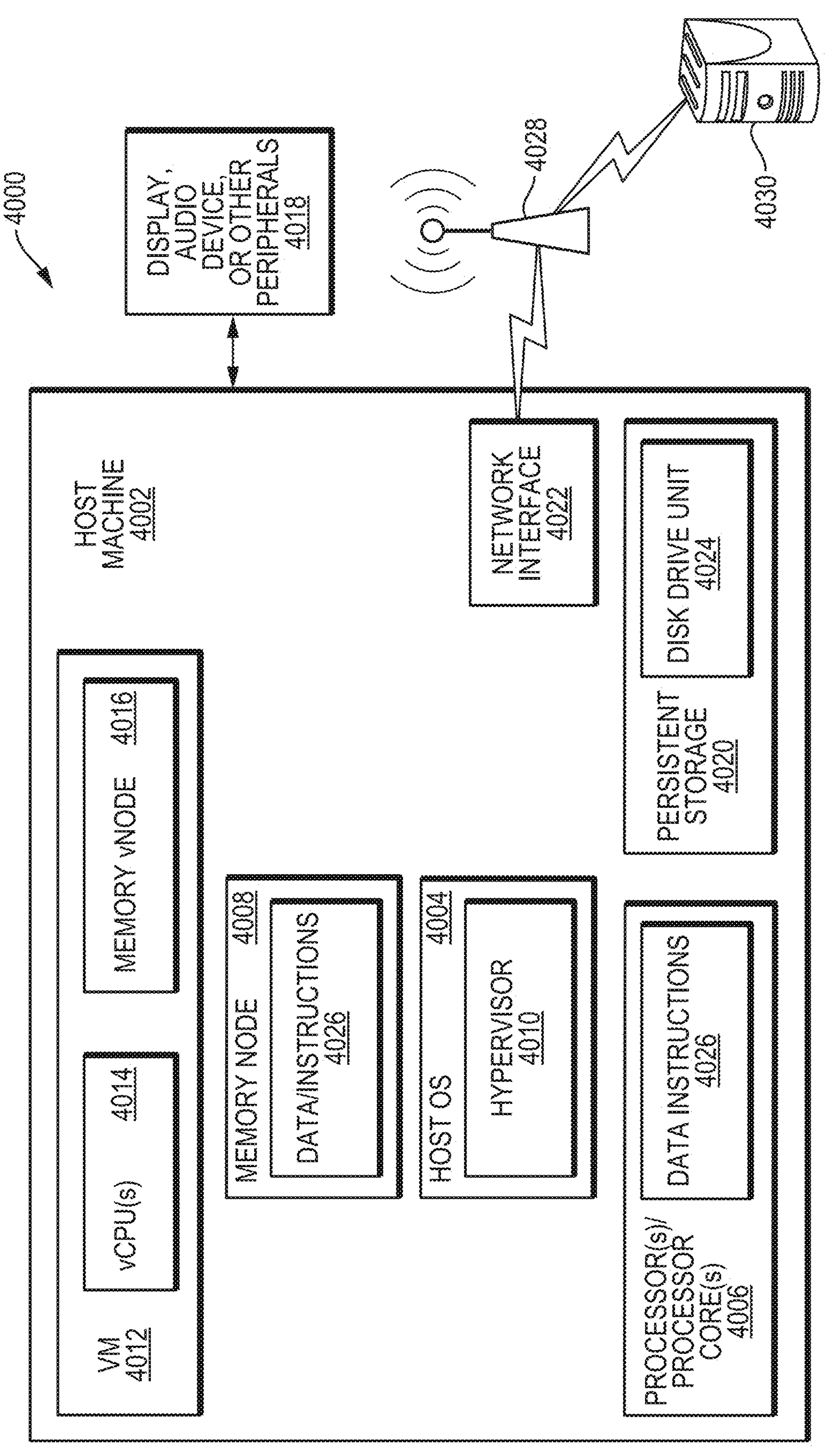

FIG. 7 is a diagrammatic representation of an example system that includes a host machine within which a set of instructions to perform any one or more of the methodologies discussed herein may be executed, according to at least one aspect of the present disclosure.

DESCRIPTION

The following disclosure may provide exemplary systems, devices, and methods for generating labels for access and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

As used herein, the term "system" may refer to one or more computing devices or combinations of computing devices (e.g., processors, servers, client devices, software applications, components of such, and/or the like).

In large organizations, due to the increase in applications, systems, databases, and platforms, there is a significant increase in the volume of access-related data (e.g., entitlements, roles, accounts) that requires a considerable amount of manual effort. Specifically, authorizing and reviewing access may rely on millions of entitlement descriptions that have to be evaluated manually and periodically. Automated access-data labeling/tagging can aid in reducing the needed manual effort. However, inaccurate tagging/labeling can present a security risk during approvals and/or user access revalidation (UAR), for example. Moreover, most access data (e.g., entitlement data) is available in natural language (human written) that is difficult for a machine to understand and process. Accordingly, natural language processing (NLP) models alone aren't effective in the task of labeling access data.

This challenge is compounded by the dynamic nature of entitlement data, where changes to access policies, user roles, and system configurations occur frequently. Traditional approaches relying solely on manual tagging or rule-based systems fail to adapt to such changes effectively, leading to outdated classifications that can compromise security and compliance. Additionally, varying terminologies and naming conventions across organizational departments add another layer of complexity, necessitating solutions that can adapt to and understand these contextual variations.

The present disclosure provides, in some aspects, an access data expert-driven NLP solution that can be used for the multi-label classification and enrichment of access data, such as entitlements. While a pre-trained supervised natural language processing neural network (NLP-NN) solution alone may deliver inaccurate results, which is not acceptable for supporting enterprise access decisions, the proposed solution controls and improves the results of a supervised NLP-NN solution. In addition to the NLP-NN, as described in greater detail below, the proposed solution also relies on an expert-driven unsupervised multi-label classifier customized for the enterprise context at hand, and optimized for access data description analysis. In some aspects, the proposed solution may further include a feedback loop that can provide a number of advantages such as reinforced neural network training using expert input for better multi-label classification accuracy.

FIGS. 1 and 2 illustrate aspects of a system 100 and a method 200, respectively, for performing multi-label classification on unlabeled access data with localized context understanding. The system 100 employs a supervised pre-trained neural network 101 (e.g., Robustly optimized BERT approach (ROBERTa), or any similar state-of-the-art open-source pre-trained neural network) and an expert-driven classifier 102 that employs an unsupervised NLP module 103 that is not a neural network. The classifier 102 further employs a similarity algorithm 104 that egests an input of the unsupervised NLP module 103. The outputs of the neural network 101 and the NLP module 103 are cooperatively utilized to apply multi-label classifications to the access data. Components of the system 100 can be implemented in software, hardware, and/or combinations of software and hardware. FIGS. 5A, 5B, and 6 depict a computer apparatus and a system including a host machine, respectively, which can be used separately, or in combination, to implement one or more components of the system 10, for example. The specialized models may leverage transfer learning to incorporate contextual nuances specific to their respective domains, improving the precision of multi-label classifications when applied to enterprise-specific data sets.

The method 200 is executable by the system 200 to generate labels for the access data based on outputs of the neural network 101 and the NLP module 103. As illustrated in FIG. 2, the method 200 includes performing 201 a frequency analysis on access data to identify high frequency occurrences and low frequency occurrences in the access data. The classifier 102 may retrieve the unlabeled access data from a database 105 to generate 204 access-data corpora 107 for the unlabeled access data. The method 200 includes grouping 202 the high frequency occurrences in a first grouping, grouping 203 the low frequency occurrences in a second grouping, and generating 204 the access-data corpora 107 by applying a similarity algorithm to the first grouping and an initial dictionary, and to the second grouping and the initial dictionary. In some aspects, the initial dictionary can be manually created from the unlabeled access data by a subject matter expert (SME), for example.

The frequency analysis process may leverage advanced tokenization techniques to parse entitlement descriptions and account names into meaningful units of text. For example, stopwords such as "and," "or," and "the" are excluded during tokenization to focus on substantive terms. Additionally, stemming and lemmatization may be applied to unify different word forms (e.g., "administer," "administration") under a common base. The preprocessing may ensure that the frequency analysis yields accurate groupings that reflect the true distribution of relevant terms in the data set.

FIG. 3 illustrates a method 300 for generating entitlement corpora from the access data, in accordance with the present disclosure. The method 300 includes reading, combining, and normalizing 301 entitlement names, entitlement descriptions, account names, and/or privilege flags associated with the entitlements in the access data, in preparation for the frequency analysis. The classifier 102 may retrieve the entitlement data from the data base 105, for example, may read, combine, and normalize 301 the entitlement data, and may perform 302 the frequency analysis, outputting 303 the high and low frequency occurrences. In some aspects, high and low frequency thresholds can be employed to determine the high and low frequency occurrences in the access data.

As illustrated in FIG. 3, the classifier 103 may filter the entitlement data for the 10% most frequent occurrences, and 10% least frequent occurrences, separating 304 them into two word groupings (e.g., most frequent bag of words and least frequent bag of words). The method 300 further includes reading the basic dictionary, which can be retrieved by the classifier 103, and comparing 305 it with the two word groupings using a similarity algorithm, e.g., cosine similarity algorithm, to create 306 the entitlement corpora.

The cosine similarity algorithm may measure the cosine of the angle between two non-zero vectors in a multi-dimensional space. For entitlement data, these vectors may represent term frequency-inverse document frequency (TF-IDF) values of words within the groupings and the basic dictionary. In one embodiment, a higher cosine similarity score indicates a stronger contextual match between terms, which is essential for aligning dictionary entries with high-frequency and low-frequency word groupings. This approach ensures that semantic relationships are captured even when exact word matches are absent.

The thresholds for most and/or least frequent occurrences can be more, or less, than 10%. In at least one example, the thresholds can be any values selected from a range of 1%-20%, a range of 1%-30%, or any other suitable range. In one aspect, the thresholds can be provided as inputs by an SME, for example. In one aspect, default values of the thresholds are assigned, and can be modified by the SME As illustrated in FIGS. 1 and 3, the access data corpora 107, e.g., entitlement corpora, comprise n-gram dictionaries such as, for example, dictionaries of positive n-grams, dictionaries of negative n-grams, and/or dictionaries of n-grams to be discarded. The n-grams can include unigrams, bigrams, trigrams, and/or any suitable n-grams, wherein n is any positive integer.

Entitlement corpora may be useful for access control audits and compliance reporting. For example, positive n-grams may help identify entitlements related to administrative privileges, which are often subject to stricter review. Similarly, negative n-grams may flag potentially redundant or conflicting access rights. By discarding irrelevant n-grams, the corpora also streamline the classification process, reducing computational overhead and improving the clarity of access control policies.

Referring again to FIG. 2, the method 200 further includes training the unsupervised natural language processing module 103, and determining 205, by the unsupervised natural language processing module 103, first multi-label classifications for the access data. The first multi-label classifications are based on the access-data corpora 107. The method further includes training the supervised neural network model 101, and determining 206, by the supervised neural network model 101, second multi-label classifications of for the access data. The second multi-label classifications are based on the access-data corpora 107 and a manually-labeled subset of the access data, which can be created by an SME, for example. The manually-labeled subset 106 of the access data and the access-data corpora 107 are utilized to train the supervised neural network model 101. In contrast, the first multi-label classifications are outputted by the unsupervised natural language processing module 103 without the aid of the manually-labeled subset of the access data.

The method 200 further includes comparing 207 the first multi-label classifications and the second multi-label classifications. In one aspect, the comparison 207 comprises aggregating the classifications based on confidence found by similarity of the classifications, for example. In addition, the method 200 further includes applying 208 multi-label classifiers to the unlabeled access data based on the comparison of the first multi-label classifications and the second multi-label classifications. In one aspect, applying 208 the multi-label classification to the unlabeled access data is based on the aggregated classifications done in the previous step (i.e. now labeled) as the training data.

FIG. 4 illustrates a method 500 for generating the first multi-label classifications by the unsupervised natural language processing module 103 based on the access-data corpora. The method 500 includes generating n-grams for the unlabeled access data, and determining tagging scores for the n-grams. The tagging scores are based on the access-data corpora. The method 500 further includes applying labels to the unlabeled access data with label probabilities based on the tagging scores. In one aspect, the tagging scores(S) can be generated using an equation, as illustrated in FIG. 4, which depends on the word frequency in the entitlement description, word frequency in the entitlement name, and stopword frequency. The equation is applied to each of the n-grams.

Each factor is assigned a relevance/irrelevance weight (e.g., $w1_i$, $w2_i$, $w3_i$) based on the access-data corpora. $K_x$ is a constant to take error into account. $K_x$ ranges from 0 to 1. P is a Privilege value factor that can be selectively added to the equation based on an attribute such as, for example, whether the label to be utilized is for Privileged or Non-Privileged information. Other value factors (e.g., value factors for production, non-production, and/or administrative labels) can be similarly utilized in the equation in addition to, or in lieu of, of the value factor P. In some aspects, where no attributes are applicable, the value P can be zero.

FIGS. 5A and 5B illustrate an alternative embodiment of the system 100 that further includes a feedback loop module 501. The feedback loop module 501 improves the confidence of tagging the dataset in order to transition the untrusted data into trusted data. The feedback loop module 501 can incorporate inputs from an SME and/or a business expert that can be used to reinforce the training of the supervised neural network 101.

The feedback loop module may operate iteratively, allowing subject matter experts (SMEs) to continuously refine classification rules and dictionaries. For instance, the module may, in some configurations, present low-confidence labels to SMEs for validation, along with associated access metadata, enabling them to confirm, reject, or modify the suggested labels. Over time, this iterative process reduces reliance on manual intervention by embedding expert knowledge into the supervised neural network and unsupervised NLP module, resulting in progressively higher accuracy and reliability.

As illustrated in FIGS. 5A and 5B, outputs of the supervised pre-trained neural network 101 and the unsupervised NLP module 103 are received by the feedback loop module 501 for manual verification by an SME and/or a business expert, for example. The manual feedback defines a manually-labeled subset 506 of the access data that is combined with the manually-labeled subset 106 of the access data, and then utilized by the feedback loop module 501 to improve the access-data corpora. The improved access-data corpora 107 are then inputted into a second supervised neural network 511 for training. The second supervised neural network 511 can then be utilized as a substitute to the supervised neural network 101.

FIG. 5C is a method 550 of improved entitlement labeling, according to at least one aspect of the present disclosure. The method 550 can be executed by the system 100, for example. FIGS. 5A and 5B illustrate interactions between an end user's workstation 110 and the system 100 to improve entitlement labeling. The method 550 includes transmitting from the workstation 110 a request for an entitlement review. An entitlement service such as, for example a User Access Revalidation (UAR) receives the request, and transmits it to an access metadata analysis and validation service that interfaces with the system 100 to identify new labels based on entitlement data received from the workstation 110.

As described above, the system 100 is configured to output labels and associated probabilities for the entitlement data. The access metadata analysis and validation service may receive the output of the system 100, and may attempt to identify inconsistencies, then may output a list of access metadata elements that needs to be addressed by the end user.

The aforementioned systems and methods, as described above with respect to each of FIGS. 1-5C, may include, or make use of, a number of computer apparatuses, computer systems, or the like. In other words, in order to utilize the systems and methods disclosed herein, at least one of a computer apparatus, computer system, or the like may be implemented. Each of these computer apparatuses, computer systems, or the like are described in greater detail below with respect to the computer apparatus 3000 shown in FIG. 6 and the example system 4000 shown in FIG. 7, which provide a connection between the solution disclosed herein and how such a solution may be implemented within a business entity, such as a payment network, a processing network, a payment processing network, or the like.

FIG. 6 is a block diagram of a computer apparatus 3000 with data processing subsystems or components, according to at least one aspect of the present disclosure. The subsystems shown in FIG. 6 are interconnected via a system bus 3010. Additional subsystems such as a printer 3018, keyboard 3026, fixed disk 3028 (or other memory comprising computer-readable media), monitor 3022 (which is coupled to a display adapter 3020), and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus 3010 allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer-readable medium.

FIG. 7 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a stand-alone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC); a tablet PC; a set-top box; a personal digital assistant; a cellular telephone; a portable music player (e.g., a portable hard drive audio device, such as an Moving Picture Experts Group Audio Layer 3 (MP3) player); a web appliance; a network router, switch, or bridge; or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit, or both), and various memory nodes 4008. The host OS 4004 may include a hypervisor 4010, which is able to control the functions and/or communicate with a virtual machine (VM) 4012 running on machine-readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other or communicate to each other via a bus (not shown) or via other coupling or communication channels or mechanisms. The host machine 4002 may further include a video display, audio device, or other peripherals 4018 (e.g., a liquid crystal display; alphanumeric input device(s) including, e.g., a keyboard; a cursor control device, e.g., a mouse; a voice recognition or biometric verification unit; an external drive; a signal generation device, e.g., a speaker); a persistent storage device 4020 (also referred to as disk drive unit); and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various OSs may be used, including UNIX, LINUX, WINDOWS, QNX ANDROID, IOS, CHROME, TIZEN, and other suitable OSs.

The disk drive unit 4024 also may be a solid-state drive, a hard disk drive, or other drive that includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service and that the computing devices may include one or more processors, buses, memory devices, display devices, I/O devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Suitable networks may include or interface with any one or more of, for instance, a local intranet; a personal area network (PAN); a local area network (LAN); a wide area network (WAN); a metropolitan area network (MAN); a virtual private network (VPN); a storage area network (SAN); a frame relay connection; an advanced intelligent network (AlN) connection; a synchronous optical network (SONET) connection; a digital T1, T3, E1, or E3 line; a digital data service (DDS) connection; a digital subscriber line (DSL) connection; an Ethernet connection; an integrated services digital network (ISDN) line; a dial-up port, such as a V.90, V.34, or V.34bis analog modem connection; a cable modem; an Asynchronous Transfer Mode (ATM) connection; or an Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, global positioning system (GPS), cellular digital packet data (CDPD), Research in Motion, Limited (RIM) duplex paging network, Bluetooth radio, or an Institute of Electrical and Electronics Engineers (IEEE) 802.11-based radio frequency (RF) network. The network 4028 can further include or interface with any one or more of an RS-232 serial connection, an IEEE-1394 (Firewire) connection, a Fiber Channel connection, an IrDA (infrared (IR)) port, a Small Computer Systems Interface (SCSI) connection, a Universal Serial Bus (USB) connection or other wired or wireless, digital, or analog interface or connection, mesh, or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during RF and IR data communications. Common forms of computer-readable media include, for example, a flexible disk, a hard disk, magnetic tape, any other magnetic medium, a compact disc ROM (CD-ROM) disk, digital video disc, any other optical medium, any other physical medium with patterns of marks or holes, a RAM, a programmable ROM, an erasable programmable ROM (EPROM), an electrically erasable programmable ROM (EEPROM), a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet service provider).

Examples of the systems and methods according to various aspects of the present disclosure are provided below in the following numbered clauses. Any aspect of a system or method may include any one or more than one, and any combination of, the numbered clauses described below.

Clause 1. A computer-implemented method, wherein the method includes performing a frequency analysis on unlabeled access data to identify high frequency occurrences and low frequency occurrences in the unlabeled access data, grouping the high frequency occurrences in a first grouping and the low frequency occurrences in a second grouping, generating access-data corpora based on the first grouping, the second grouping, and an initial dictionary using a similarity algorithm, determining first multi-label classifications for the unlabeled access data and second multi-label classifications for the unlabeled access data, comparing the first multi-label classifications and the second multi-label classifications, and applying multi-label classifiers to the unlabeled access data based on the comparison of the first multi-label classifications and the second multi-label classifications. The initial dictionary is manually created from the unlabeled access data. The access-data corpora include n-gram dictionaries. The first multi-label classifications are determined by an unsupervised natural language processing module and based on the access-data corpora. The second multi-label classifications are determined by a supervised neural network module and based on the access-data corpora and a manually-labeled subset of the access data.

Clause 2. The computer-implemented method of Clause 1, wherein determining the first multi-label classifications based on the access-data corpora includes generating n-grams for the unlabeled access data, determining tagging scores for the n-grams, and applying labels to the unlabeled access data with label probabilities based on the tagging scores. The tagging scores are based on the access-data corpora.

Clause 3. The computer-implemented method of Clause 2, wherein the unlabeled access data comprise entitlement data, and wherein determining the tagging scores is based on entitlement description frequencies in the entitlement data, entitlement name frequencies in the entitlement data, and stopword frequencies in the entitlement data.

Clause 4. The computer-implemented method of Clauses 2 or 3, wherein determining the tagging scores includes assigning weights based on the access-data corpora. The weights are assigned to the entitlement description frequencies, the entitlement name frequencies, and the stopword frequencies.

Clause 5. The computer-implemented method of any one of Clauses 1-4, wherein the n-gram dictionaries include dictionaries of positive n-grams, dictionaries of negative n-grams, and dictionaries of n-grams to be discarded.

Clause 6. The computer-implemented method of any one of Clauses 1-5, wherein identifying the high frequency occurrences in the access data is based on a high frequency threshold.

Clause 7. The computer-implemented method of any one of Clauses 1-6, wherein identifying the low frequency occurrences in the access data is based on a low frequency threshold.

Clause 8. The computer-implemented method of any one of Clauses 1-7, wherein the similarity algorithm is a cosine similarity algorithm.

Clause 9. An access-data classification system, wherein the access-data classification system includes an access-data corpora generator, an unsupervised natural language processing module, and a supervised neural network trained by a manually-labeled subset of the access data and the access-data corpora. The access-data corpora generator is configured to receive access data, receive an initial dictionary based on the access data, perform a frequency analysis on the access data to identify high frequency occurrences and low frequency occurrences in the access data, group the high frequency occurrences in a first grouping, group the low frequency occurrences in a second grouping, and generate access-data corpora based on the first grouping, the second grouping, and the initial dictionary using a similarity algorithm. The initial dictionary is manually created. The access-data corpora includes n-gram dictionaries. The unsupervised natural language processing module is configured to receive the access data, receive the access-data corpora from the access-data corpora generator, and determine first multi-label classifications for the access data. The first multi-label classifications are based on the access-data corpora. The supervised neural network is configured to determine second multi-label classifications for the access data independent of the first multi-label classifications. The access-data classification system is configured to apply multi-label classifiers to the access data based on a comparison of the first multi-label classifications and the second multi-label classifications.

Clause 10. The access-data classification system of Clause 9, wherein the unsupervised natural language processing module is configured to generate n-grams for the access data, determine tagging scores for the n-grams, and apply labels to the access data with label probabilities based on the tagging scores. The tagging scores are based on the access-data corpora.

Clause 11. The access-data classification system of Clause 10, wherein the access data include entitlement data, and wherein the unsupervised natural language processing module is configured to determine the tagging scores based on entitlement description frequencies in the entitlement data, entitlement name frequencies in the entitlement data, and stopword frequencies in the entitlement data.

Clause 12. The access-data classification system of any one of Clauses 9-11, wherein the unsupervised natural language processing module is configured to assigning weights based on the access-data corpora. The weights are assigned to the entitlement description frequencies, the entitlement name frequencies, and the stopword frequencies.

Clause 13. The access-data classification system of any one of Clauses 9-12, wherein the access-data corpora include dictionaries of positive n-grams, dictionaries of negative n-grams, and dictionaries of n-grams to be discarded.

Clause 14. The access-data classification system of any one of Clauses 9-13, wherein the high frequency occurrences in the access data are based on a high frequency threshold.

Clause 15. The access-data classification system of any one of Clauses 9-14, wherein the low frequency occurrences in the access data are based on a low frequency threshold.

Clause 16. The access-data classification system of any one of Clauses 9-15, wherein the similarity algorithm is a cosine similarity algorithm.

Clause 17. A computer-implemented method includes performing a frequency analysis on unlabeled access data to identify high frequency occurrences and low frequency occurrences in the unlabeled access data; grouping the occurrences into a plurality of groupings based on the frequency analysis; generating access-data corpora based on the plurality of groupings, and an initial dictionary using a similarity algorithm, wherein the initial dictionary is manually created from the unlabeled access data, and wherein the access-data corpora comprise n-gram dictionaries; determining, by an unsupervised natural language processing module, first multi-label classifications for the unlabeled access data, wherein the first multi-label classifications are based on the access-data corpora; determining, by a supervised neural network module, second multi-label classifications for the unlabeled access data, wherein the second multi-label classifications are based on the access-data corpora and a manually-labeled subset of the access data; and applying multi-label classifiers to the unlabeled access data based on the first multi-label classifications and the second multi-label classifications.

Clause 18. The computer-implemented method of Clause 17, wherein determining the first multi-label classifications based on the access-data corpora comprises: generating n-grams for the unlabeled access data; determining tagging scores for the n-grams, wherein the tagging scores are based on the access-data corpora; and applying labels to the unlabeled access data with label probabilities based on the tagging scores.

Clause 19. The computer-implemented method of Clause 18, wherein the unlabeled access data comprise entitlement data, and wherein determining the tagging scores is based on: entitlement description frequencies in the entitlement data; entitlement name frequencies in the entitlement data; and stopword frequencies in the entitlement data.

Clause 20. The computer-implemented method of Clause 19, wherein determining the tagging scores further comprises assigning weights based on the access-data corpora, and wherein the weights are assigned to: the entitlement description frequencies; the entitlement name frequencies; and the stopword frequencies.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms, and an illustrative form of the subject matter described herein applies regardless of the particular type of signal-bearing medium used to actually carry out the distribution.

Instructions used to program logic to perform various disclosed aspects can be stored within a memory in the system, such as dynamic RAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), including, but not limited to, floppy diskettes, optical disks, CD-ROMs, magneto-optical disks, ROM, RAM, EPROM, EEPROM, magnetic or optical cards, flash memory, or a tangible, machine-readable storage used in the transmission of information over the Internet via electrical, optical, acoustical, or other forms of propagated signals (e.g., carrier waves, IR signals, digital signals). Accordingly, the non-transitory computer-readable medium includes any type of tangible machine-readable medium suitable for storing or transmitting electronic instructions or information in a form readable by a machine (e.g., a computer).

Any of the software components or functions described in this application may be implemented as software code to be executed by a processor using any suitable computer language, such as, for example, Python, Java, C++, or Perl, using, for example, conventional or object-oriented techniques. The software code may be stored as a series of instructions or commands on a computer-readable medium, such as RAM, ROM, a magnetic medium such as a hard drive or a floppy disk, or an optical medium such as a CD-ROM. Any such computer-readable medium may reside on or within a single computational apparatus and may be present on or within different computational apparatuses within a system or network.

As used in any aspect herein, the term "logic" may refer to an app, software, firmware, and/or circuitry configured to perform any of the aforementioned operations. Software may be embodied as a software package, code, instructions, instruction sets, and/or data recorded on a non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states that may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol, which may be capable of permitting communication using a Transmission Control Protocol/Internet Protocol. The Ethernet protocol may comply or be compatible with the Ethernet standard published by the IEEE titled "IEEE 802.3 Standard," published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector. Alternatively or additionally, the communication devices may be capable of communicating with each other using a frame relay communications protocol. The frame relay communications protocol may comply or be compatible with a standard promulgated by Consultative Committee for International Telegraph and Telephone and/or the American National Standards Institute. Alternatively or additionally, the transceivers may be capable of communicating with each other using the ATM communications protocol. The ATM communications protocol may comply or be compatible with an ATM standard published by the ATM Forum titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories, registers, or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those skilled in the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A," "B," or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

As used herein, the singular form of "a," "an," and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. None is admitted to be prior art.

In summary, numerous benefits have been described that result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms with various modifications as are suited to the particular use contemplated. It is intended that the claims submitted herewith define the overall scope.

What is claimed is:

1. A computer-implemented method, comprising:

performing a frequency analysis on unlabeled access data to identify high frequency occurrences and low frequency occurrences in the unlabeled access data;

grouping the high frequency occurrences in a first grouping;

grouping the low frequency occurrences in a second grouping;

generating access-data corpora based on the first grouping, the second grouping, and an initial dictionary using a similarity algorithm, by computing term frequency-inverse document frequency (TF-IDF) vector representations of terms in the first grouping, the second grouping, and the initial dictionary, and comparing the TF-IDF vector representations of the first grouping and the second grouping against the TF-IDF vector representations of the initial dictionary using a cosine similarity algorithm to create the access-data corpora based on cosine similarity scores, wherein the initial dictionary is manually created from the unlabeled access data, and wherein the access-data corpora comprise n-gram dictionaries;

determining, by an unsupervised natural language processing module, first multi-label classifications for the unlabeled access data, wherein the first multi-label classifications are based on the access-data corpora;

determining, by a supervised neural network module that is trained using both the access-data corpora and a manually-labeled subset of the access data and that operates independently of the unsupervised natural language processing module, second multi-label classifications for the unlabeled access data, wherein the second multi-label classifications are based on the access-data corpora and a manually-labeled subset of the access data;

comparing the first multi-label classifications and the second multi-label classifications by aggregating the first multi-label classifications and the second multi-label classifications based on a confidence determined by a cosine similarity between the first multi-label classifications and the second multi-label classifications; and applying multi-label classifiers to the unlabeled access data based on the comparison of the first multi-label classifications and the second multi-label classifications.

2. The computer-implemented method of claim 1, wherein determining the first multi-label classifications based on the access-data corpora comprises: generating n-grams for the unlabeled access data;

determining tagging scores for the n-grams, wherein the tagging score(S) for each n-gram is computed according to: $S=K_1\times(\Sigma w1_i\times edf_i/\Sigma w1_i)+K_2\times(\Sigma w2_i\times enf_i/\Sigma w2_i)-K_3\times(\Sigma w3_i\times Sf_i/\Sigma w3_i)+P$, wherein $K_1$, $K_2$, and $K_3$ are constants ranging from 0 to 1 that account for measurement error in respective frequency values, edf is an entitlement description frequency for an n-gram, enf is an entitlement name frequency for the n-gram, Sf is a stopword frequency for the n-gram, w1, w2, and w3 are corpus-derived weights assigned to edf, enf, and Sf respectively based on the access-data corpora, and P is a privilege value factor that is non-zero when a label to be applied corresponds to a privileged access classification and is zero when no privilege attribute is applicable to the label; and applying labels to the unlabeled access data with label probabilities based on the tagging scores.

3. The computer-implemented method of claim 2, wherein the unlabeled access data comprise entitlement data, and wherein determining the tagging scores is based on:

entitlement description frequencies in the entitlement data;

entitlement name frequencies in the entitlement data; and stopword frequencies in the entitlement data.

4. The computer-implemented method of claim 3, wherein determining the tagging scores further comprises assigning weights based on the access-data corpora, and wherein the weights are assigned to:

the entitlement description frequencies;

the entitlement name frequencies; and the stopword frequencies.

5. The computer-implemented method of claim 1, wherein the n-gram dictionaries comprise:

dictionaries of positive n-grams;

dictionaries of negative n-grams; and dictionaries of n-grams to be discarded.

6. The computer-implemented method of claim 1, wherein identifying the high frequency occurrences in the access data is based on a high frequency threshold.

7. The computer-implemented method of claim 6, wherein identifying the low frequency occurrences in the access data is based on a low frequency threshold.

8. An access-data classification system, comprising:

an access-data classifier, comprising:

an access-data corpora generator configured to:

receive access data;

receive an initial dictionary based on the access data, wherein the initial dictionary is manually created;

perform a frequency analysis on the access data to identify high frequency occurrences and low frequency occurrences in the access data;

group the high frequency occurrences in a first grouping;

group the low frequency occurrences in a second grouping; and generate access-data corpora based on the first grouping, the second grouping, and the initial dictionary by computing term frequency-inverse document frequency (TF-IDF) vector representations of terms in the first grouping, the second grouping, and the initial dictionary, and comparing the TF-IDF vector representations of the first grouping and the second grouping against the TF-IDF vector representations of the initial dictionary using a cosine similarity algorithm to create the access-data corpora based on cosine similarity scores, wherein the access-data corpora comprise n-gram dictionaries;

an unsupervised natural language processing module configured to:

receive the access data;

receive the access-data corpora from the access-data corpora generator; and determine first multi-label classifications for the access data, wherein the first multi-label classifications are based on the access-data corpora; and a supervised neural network trained by both the access-data corpora and a manually-labeled subset of the access data and the access-data corpora and that operates independently of the unsupervised natural language processing module, wherein the supervised neural network is configured to determine second multi-label classifications for the access data independent of the first multi-label classifications wherein the access-data classification system is configured to apply multi-label classifiers to the access data by aggregating the first multi-label classifications and the second multi-label classifications based on a confidence determined by a cosine similarity between the first multi-label classifications and the second multi-label classifications.

9. The access-data classification system of claim 8, wherein the unsupervised natural language processing module is configured to:

generate n-grams for the access data;

determine tagging scores for the n-grams, wherein the tagging score(S) for each n-gram is computed according to: $S=K_1\times(\Sigma w1_i\times edf_i/\Sigma w1_i)+K_2\times(\Sigma w2_i\times enf_i/\Sigma w2_i)-K_3\times(\Sigma w3_i\times Sf_i/\Sigma w3_i)+P$, wherein $K_1$, $K_2$, and $K_3$ are constants ranging from 0 to 1 that account for measurement error in respective frequency values, edf is an entitlement description frequency for an n-gram, enf is an entitlement name frequency for the n-gram, Sf is a stopword frequency for the n-gram, w1, w2, and w3 are corpus-derived weights assigned to edf, enf, and Sf respectively based on the access-data corpora, and P is a privilege value factor that is non-zero when a label to be applied corresponds to a privileged access classification and is zero when no privilege attribute is applicable to the label; and apply labels to the access data with label probabilities based on the tagging scores.

10. The access-data classification system of claim 9, wherein the access data comprise entitlement data, and wherein the unsupervised natural language processing module is configured to determine the tagging scores based on:

entitlement description frequencies in the entitlement data;

entitlement name frequencies in the entitlement data; and stopword frequencies in the entitlement data.

11. The access-data classification system of claim 10, wherein the unsupervised natural language processing module is configured to assigning weights based on the access-data corpora, and wherein the weights are assigned to:

the entitlement description frequencies;

the entitlement name frequencies; and the stopword frequencies.

12. The access-data classification system of claim 8, wherein the access-data corpora comprise:

dictionaries of positive n-grams;

dictionaries of negative n-grams; and dictionaries of n-grams to be discarded.

13. The access-data classification system of claim 8, wherein the high frequency occurrences in the access data are based on a high frequency threshold.

14. The access-data classification system of claim 13, wherein the low frequency occurrences in the access data are based on a low frequency threshold.

15. The access-data classification system of claim 8, wherein the similarity algorithm is a cosine similarity algorithm.

16. A computer-implemented method, comprising:

performing a frequency analysis on unlabeled access data to identify high frequency occurrences and low frequency occurrences in the unlabeled access data;

grouping the occurrences into a plurality of groupings based on the frequency analysis;

generating access-data corpora based on the plurality of groupings, and an initial dictionary by computing term frequency-inverse document frequency (TF-IDF) vector representations of terms in the plurality of groupings and the initial dictionary, and comparing the TF-IDF vector representations of the plurality of groupings against the TF-IDF vector representations of the initial dictionary using a cosine similarity algorithm to create the access-data corpora based on cosine similarity scores, wherein the initial dictionary is manually created from the unlabeled access data, and wherein the access-data corpora comprise n-gram dictionaries;

determining, by an unsupervised natural language processing module, first multi-label classifications for the unlabeled access data, wherein the first multi-label classifications are based on the access-data corpora;

determining, by a supervised neural network module that is trained using both the access-data corpora and a manually-labeled subset of the access data and that operates independently of the unsupervised natural language processing module, second multi-label classifications for the unlabeled access data, wherein the second multi-label classifications are based on the access-data corpora and a manually-labeled subset of the access data; and applying multi-label classifiers to the unlabeled access data based on the first multi-label classifications and the second multi-label classifications.

17. The computer-implemented method of claim 16, wherein determining the first multi-label classifications based on the access-data corpora comprises:

generating n-grams for the unlabeled access data;

determining tagging scores for the n-grams, wherein the tagging score(S) for each n-gram is computed according to: $S=K_1\times(\Sigma w1_i\times edf_i/\Sigma w1_i)+K_2\times(\Sigma w2_i\times enf_i/\Sigma w2_i)-K_3\times(w3_i\times Sf_i/\Sigma w3_i)+P$, wherein $K_1$, $K_2$, and $K_3$ are constants ranging from 0 to 1 that account for measurement error in respective frequency values, edf is an entitlement description frequency for an n-gram, enf is an entitlement name frequency for the n-gram, Sf is a stopword frequency for the n-gram, w1, w2, and w3 are corpus-derived weights assigned to edf, enf, and Sf respectively based on the access-data corpora, and P is a privilege value factor that is non-zero when a label to be applied corresponds to a privileged access classification and is zero when no privilege attribute is applicable to the label; and applying labels to the unlabeled access data with label probabilities based on the tagging scores.

18. The computer-implemented method of claim 17, wherein the unlabeled access data comprise entitlement data, and wherein determining the tagging scores is based on:

entitlement description frequencies in the entitlement data;

entitlement name frequencies in the entitlement data; and
stopword frequencies in the entitlement data.

19. The computer-implemented method of claim 18, wherein determining the tagging scores further comprises assigning weights based on the access-data corpora, and wherein the weights are assigned to:

the entitlement description frequencies;
the entitlement name frequencies; and
the stopword frequencies.

20. The computer-implemented method of claim 1, further comprising:

receiving, by a feedback loop module, the first multi-label classifications and the second multi-label classifications;

presenting, to at least one of a subject matter expert or a business expert, low-confidence labels from the first multi-label classifications and the second multi-label classifications for manual verification, together with associated access metadata;

receiving, from the at least one of the subject matter expert or the business expert, manual feedback defining a second manually-labeled subset of the access data;

combining the second manually-labeled subset with the manually-labeled subset to generate improved access-data corpora; and training a second supervised neural network using the improved access-data corpora and the combined manually-labeled subsets, wherein the second supervised neural network is configured to replace the supervised neural network module for subsequent multi-label classifications of access data.

* * * * *